United States Patent
Kraetzl et al.

(10) Patent No.: US 6,591,685 B2
(45) Date of Patent: Jul. 15, 2003

(54) PRESSURE SENSOR

(75) Inventors: Jürgen Kraetzl, Althegnenberg (DE); Markus Hugenschmidt, München (DE)

(73) Assignee: W.E.T. Automotive Systems AG, Odelzhausen (DE)

( * ) Notice: Subject to any disclaimer, the term of this patent is extended or adjusted under 35 U.S.C. 154(b) by 0 days.

(21) Appl. No.: 09/802,432

(22) Filed: Mar. 9, 2001

(65) Prior Publication Data

US 2001/0020714 A1 Sep. 13, 2001

(51) Int. Cl.[7] .................................................. G01L 9/12
(52) U.S. Cl. ........................................... 73/718; 73/724
(58) Field of Search ..................... 361/283.4; 73/724, 73/718

(56) References Cited

U.S. PATENT DOCUMENTS

| | | | | |
|---|---|---|---|---|
| 4,168,517 A | * | 9/1979 | Lee ........................... 361/283.4 |
| 5,005,421 A | * | 4/1991 | Hegner et al. ................. 73/72 |
| 5,194,697 A | * | 3/1993 | Hegner et al. ............... 171/151 |
| 5,539,611 A | * | 7/1996 | Hegner et al. ........... 361/283.4 |
| 5,719,740 A | * | 2/1998 | Hayashi et al. .......... 367/283.4 |
| 5,792,957 A | * | 8/1998 | Luder et al. ................... 73/724 |

* cited by examiner

Primary Examiner—Edward Lefkowitz
Assistant Examiner—Jermaine Jenkins

(57) ABSTRACT

The present invention relates to a pressure sensor comprising a capacitor with a first capacitor pole element (1) and at least one additional capacitor pole element (3) arranged at a distance from one another. In accordance with the invention, at least one capacitor pole element (1, 3) has at least one textured region (31, 31' and/or 32, 32') on the surface of its conductive components facing toward the other capacitor pole element (3, 1), and the distance between the two capacitor pole elements (1,3) is different in the textured region (31,31' and/or 32; 32') than in an adjacent region (32, 32' and/or 31, 31') to the textured region (31; 31' and/or 32, 32'). The difference between these two different distances can be changed—more particularly, reduced—by deformation of at least one capacitor pole element (1,3) when the capacitor is subjected to pressure.

21 Claims, 4 Drawing Sheets

PRESSURE SENSOR

BACKGROUND

The present invention relates generally to a pressure sensor and, more particularly, concerns a capacitive pressure sensor with a first capacitor pole element and at least one additional capacitor pole element, which are arranged at a distance from one another.

It is known to integrate pressure sensors in vehicle seats, for example, in order to detect whether the seat in question is occupied. This is relevant for the triggering of airbags, for instance.

Referring now to FIG. 1, it shows the base 11 of a seat. Placed on said base 11 is a pressure sensor 100 with electrical connecting lines 4 and 5. A seat cushion 9 is set on the base 11 and the pressure sensor 100.

During operation, a user generates a force F on the seat cushion 9 as a result of his body weight. The base 11 of the seat opposes this force so that the sensor 100 is squeezed and registers loading of the seat.

Known sensors have, as shown in FIG. 2, a first capacitor pole element 1 and a second capacitor pole element 3, which are composed of an electrically conductive material. The material used for this purpose may be a metal foil, for example.

The first capacitor pole element 1 and the second capacitor pole element 3 are separated from one another by an insulating device 2. The insulating device 2 consists of a compressible, electrically nonconductive material, and insulates the two capacitor pole elements 1, 3 from one another. The capacitor pole element 3 is connected to an electronic analysis unit (not shown) by the connecting line 5 of FIG. 1. The capacitor pole element 1 is connected to the connecting line 4 of FIG. 1 for this purpose.

When such a sensor is loaded by the weight of a person, this leads to compression of the insulating device 2 and thus causes the capacitor pole elements 1, 3 to approach one another. As a result, the capacitor comprising the capacitor pole elements 1, 3 changes its capacitance. When this change exceeds a predetermined threshold value, the electronic analysis unit recognizes this as a change from the unoccupied to the occupied state.

Removing the load from the seat causes the capacitor plates 1, 3 to move in the opposite direction, and brings about another change in capacitance which likewise can be detected. If the change is large enough, the seat is recognized as "vacant" again.

A disadvantage of the prior art is that the achievable functional reliability is inadequate. If the threshold value for the required change in capacitance is set too high, the weight of light individuals, such as children for instance, may under certain circumstances be insufficient for the seat to be recognized as occupied. If the required threshold value is set too low, material stresses in the seat, for instance resulting from changes in temperature and humidity, can cause a false "occupied" signal.

SUMMARY OF THE INVENTION

It is thus an object of the present invention to provide a new and improved pressure sensor arrangement for vehicle seats.

According to the present invention, the foregoing and other objects and advantages are obtained by a pressure sensor comprising at least one capacitor pole element having at least one textured region on the surface of its conductive components facing toward the other capacitor pole element. The distance between the two capacitor pole elements is different in the textured region than in a region adjacent to the textured region. The difference between these two different distances can be changed—more particularly, reduced—by deformation of at least one capacitor pole element when the capacitor is subjected to pressure. This permits an increase in the capacitor's capacitance as a result of concentration of conductive material of the capacitor pole element near the opposite capacitor pole element.

In another aspect of the invention, a pressure sensor with a first capacitor pole element, at least one additional capacitor pole element and at least one electrically nonconductive insulating device, of which at least part is arranged between the two capacitor pole elements is provided. Preferably, at least one capacitor pole element in at least one section of its surface facing the other capacitor pole element is spaced apart from the insulating device, and configured such that the section can be moved toward the insulating device through flexible deformation of the capacitor pole by subjecting the pressure sensor to pressure. This permits an increase in the capacitor's capacitance as a result of concentration of conductive material of the capacitor pole element near the opposite capacitor pole element.

In another aspect of the invention, a pressure sensor with a first capacitor pole element, at least one additional capacitor pole element, and at least one electrically nonconductive insulating device, of which at least part is arranged between the two capacitor pole elements is provided. Preferably, at least one capacitor pole element on the surface of its electrically conductive components facing the other capacitor pole element has at least one textured region of a certain normal height. The normal height is capable of being reduced to a detection height through flexible deformation of the capacitor pole element when the pressure sensor is subjected to pressure.

In one embodiment of the invention, at least one of the capacitor pole elements is compressible toward the insulating device.

In another embodiment of the invention, one capacitor pole element is compressible only in one surface region facing the insulating device. This makes it possible to ensure sensor functionality while simultaneously making it possible to implement the capacitor pole element such that it is as robust as possible.

In another embodiment of the invention, one capacitor pole element is at least partly rigid and/or at least partly flexible.

In a further embodiment of the invention, one of the capacitor pole elements has a metallized textile made of synthetic fibers. This allows for economical manufacture and adequate flexibility of the capacitor pole element.

In still another embodiment of the invention, one of the capacitor pole elements has electrically conductive fibers, which are embedded in an electrically nonconductive, elastically deformable material. This allows for economical manufacture and adequate flexibility of the capacitor pole element.

In another embodiment of the invention, at least two different, electrically nonconductive media are arranged between the capacitor pole elements. At least one of the media is a fluid which can be displaced from the region between the two capacitor pole elements when pressure is applied to the pressure sensor. This makes it possible to use other media besides air, such as carbon dioxide or oil, for example, in order to avoid corrosion problems.

In further embodiments of the invention, the insulating device is at least partly rigid and/or at least partly flexible and/or is essentially incompressible in the direction of the applied pressure.

In another embodiment of the invention, the insulating device is embodied as a foil or film. This allows for a very flat construction.

In still another embodiment of the invention, the normal height of the texturing between the insulating device and the capacitor pole element, at least in one section, is between one and ten millimeters and, more particularly, between ten microns and one millimeter.

In another embodiment of the invention, a device for detecting the presence of a person on a motor vehicle seat has a pressure sensor with one of the above features.

In a further embodiment of the invention, the base of the motor vehicle seat constitutes one of the capacitor pole elements.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should now be made to the embodiments illustrated in greater detail in the accompanying drawings and described below by way of examples of the invention.

In the drawings:

FIG. 4a is a schematic diagram of a pressure sensor according to a second embodiment seen from the front in perspective view.

DETAILED DESCRIPTION OF THE INVENTION

Figure 1:
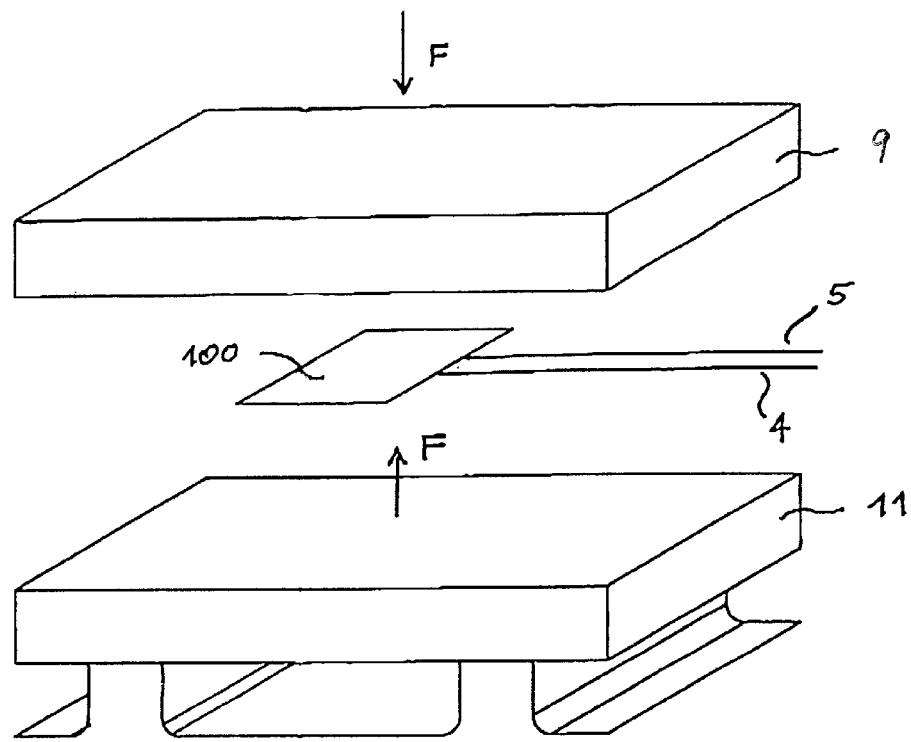
FIG. 1 is a base portion of a seat with pressure sensor viewed from the front in an exploded view.
Figure 2:
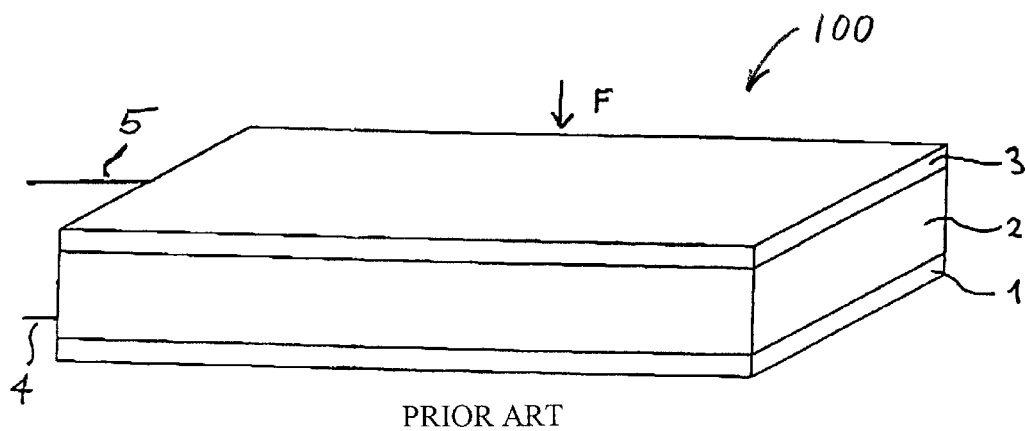
FIG. 2 is a schematic diagram of a two capacitor pole pressure sensor according to the prior art.
Figure 3A:
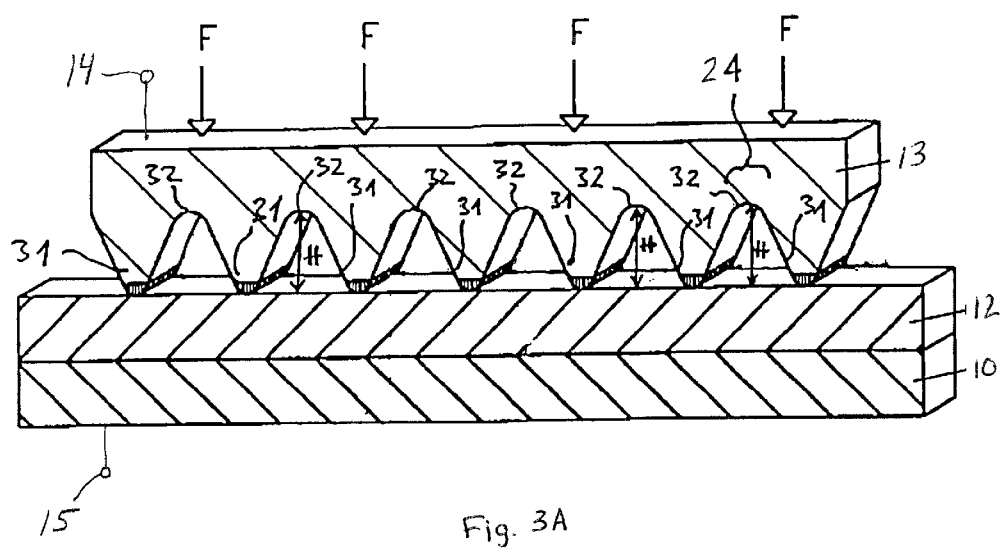
FIG. 3a is a schematic diagram of a pressure sensor according to a first embodiment seen from the front in perspective view.

FIG. 3a shows a schematic diagram of a pressure sensor according to a first embodiment. The pressure sensor includes first capacitor pole element 10, which is designed as a flat, rectangular layer of electrically conductive material. The capacitor pole element 10 is covered by an insulating device 12 in the form of a likewise rectangular, flat layer of electrically nonconductive material. The two layers can take the form of a polyethylene film coated with copper, for instance, as in the example embodiment.

A second capacitor pole element 13 is arranged on the side of the insulating device 12 facing away from the first capacitor pole element 10. This, too, is designed essentially as a flat, rectangular layer of conductive material. The capacitor pole element 10 is connected to an electronic analysis unit (not shown) by connecting line 15 and the capacitor pole element 13 is connected to the electronic analysis unit by connecting line 14. In the example embodiment, the second capacitor pole element 13 takes the form of a layer of electrically conductive foam material. The capacitor pole element 13 has, on its surface facing the insulating device 12, texturing in the form of projections 31 and recesses 32. The projections 31 rest against the insulating device 12. The recesses 32 are spaced apart from the surface of the insulating device 2. The, recesses 32 have a normal height H.

Figure 3B:
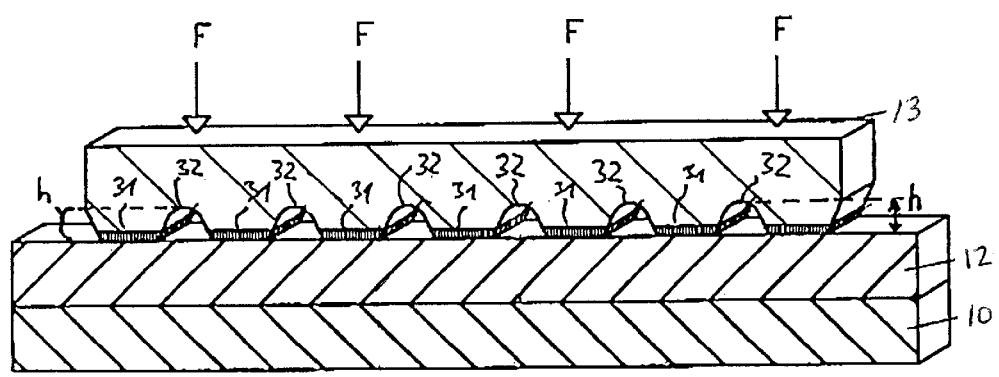
FIG. 3b is a schematic diagram of the sensor of FIG. 3a under load, seen from the front in perspective view.

FIG. 3b shows the example embodiment from FIG. 3a subjected to loading over its area with a force F. The capacitor pole element 10 and the insulating device 12 remain essentially unchanged here. The projections 31 of the capacitor pole element 10 which face toward the insulating device 12 are compressed and flattened at their tips. This increases the contact area of the capacitor pole element 13 with the insulating device 12. Furthermore, the normal height H of the recesses 32 is reduced to a detection height h. Both effects have the result that the quantity of conductive material that is located in the vicinity of the insulating device 12 is increased. This increases the capacitance of the capacitor. Loading of the pressure sensor can thus be detected as a change in the capacitance of the capacitor.

The normal height H of the textured region 31, 32 between the insulating device 12 and the capacitor pole element 13 at least in one section 24 is between one and ten millimeters and, preferably, between ten microns and one millimeter.

FIG. 4a shows another version of a pressure sensor according to the present invention. Like the embodiment in FIG. 3, it has a first, layer-like capacitor pole element 10 and an insulating device 12 covering this element.

The second capacitor pole element 23 takes the form of an elongated, corrugated electrical conductor, however. Advantageously, it is a fiber or a thread in an electrically conductive textile. In the region of its projections or troughs 31', the capacitor pole element 23 rests against the surface of the insulating device 12 facing away from the capacitor pole element 10. Its recesses 32' are spaced a distance away from the surface of the insulating device 12. They have a normal height H.

Figure 4B:
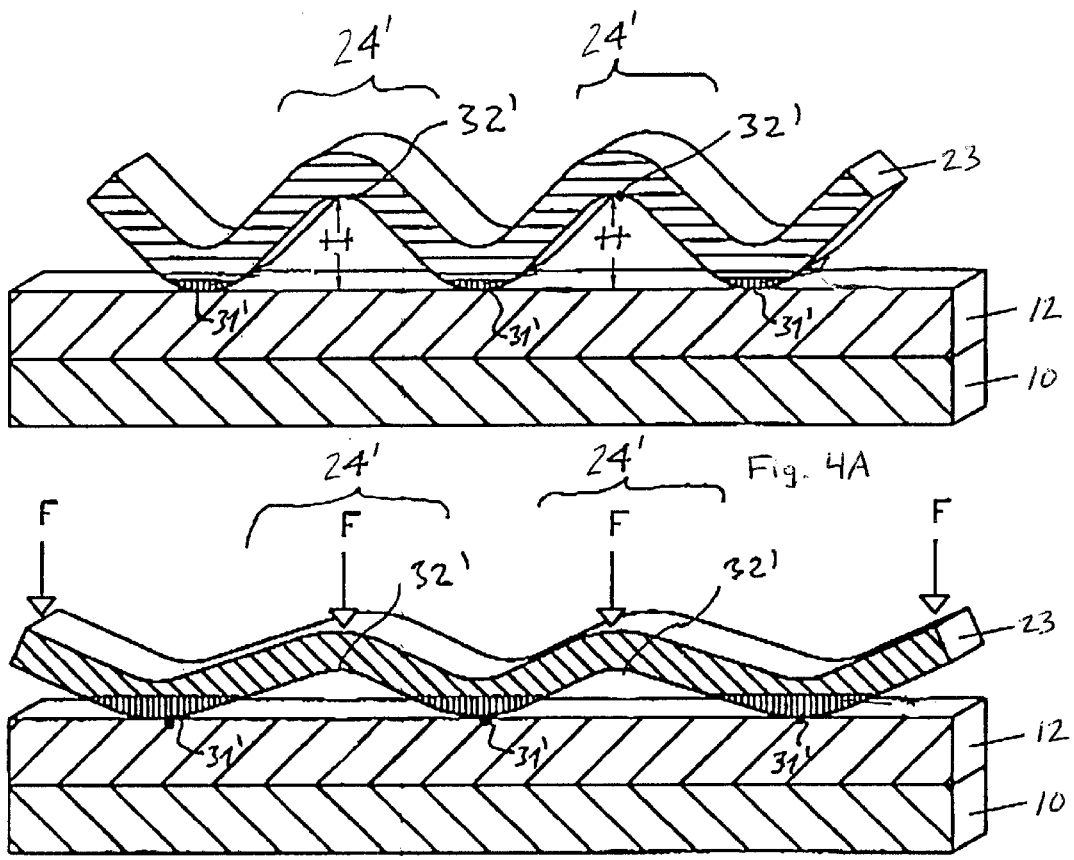
FIG. 4b is a schematic diagram of the sensor of FIG. 4a under load, seen from the front in perspective view.

FIG. 4b shows the sensor from FIG. 4a under load with a force F acting over the surface area. Whereas the capacitor pole element 10 and the insulating device 12 remain essentially unchanged, the recesses 32' are moved toward the insulating device 12. This reduces their normal height H to a detection height h. The corrugated structure flattens as a whole. As a result, the quantity of electrically conductive material in the vicinity of the projections 31' increases, which effectively contributes to the capacitance of the capacitor. Consequently, this arrangement also produces an increased capacitance when the pressure sensor is loaded.

The normal height of the textured region 31', 32' between the insulating device 12 and the capacitor pole element 23 at least in one section 24' is between one and ten millimeters and, preferably, between ten microns and one millimeter.

Figure 5A:
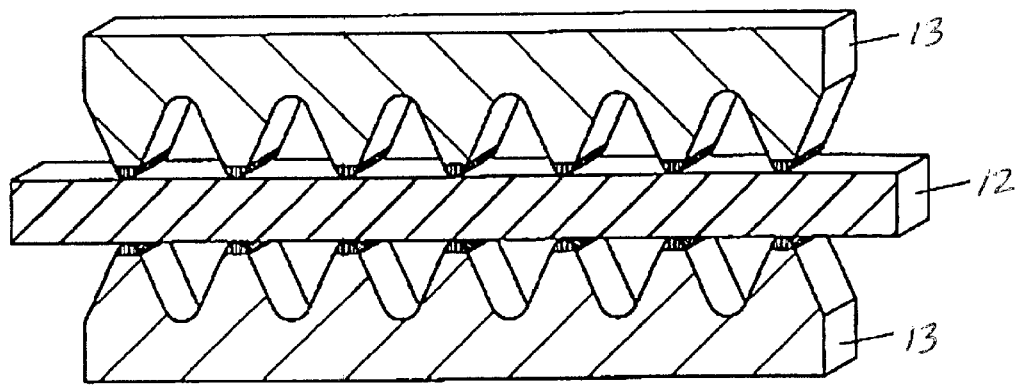
FIG. 5a is a schematic diagram of a pressure sensor according to a third embodiment seen from the front in perspective view.
Figure 5B:
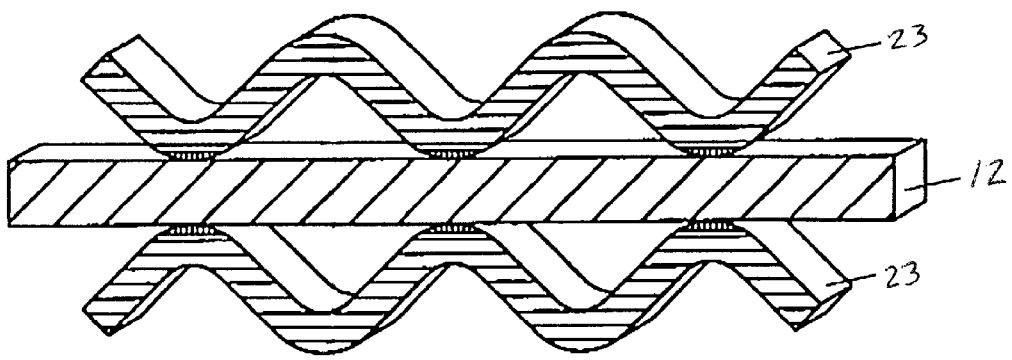
FIG. 5b is a schematic diagram of a pressure sensor according to a fourth embodiment seen from the front in perspective view.
Figure 5C:
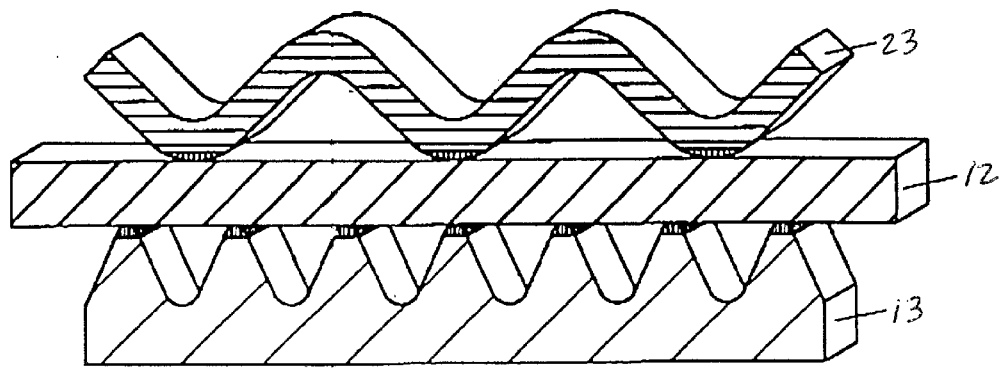
FIG. 5c is a schematic diagram of a pressure sensor according to a fifth embodiment seen from the front in perspective view.

FIG. 5 shows contemplated combinations of the sensor arrangements shown in FIG. 3 and FIG. 4. In the embodiments illustrated in FIGS. 5a through 5c, like components are given the same reference characters.

FIG. 5a shows a pressure sensor in which both capacitor plates 13 have the structure of the capacitor pole element illustrated in FIG. 3. An arrangement of this nature can be achieved, for example, by stacking two electrically conductive foam layers with a polyethylene film therebetween.

FIG. 5b shows a pressure sensor in which both capacitor pole elements 23 have the structure of the capacitor pole element illustrated in FIG. 4. An arrangement of this nature results, for example, from stacking two electrically conductive textiles with a plastic film therebetween.

FIG. 5c shows a combination of a corrugated capacitor pole element 23 as in FIG. 4 and a capacitor pole element 13 with the surface structure illustrated in FIG. 3. This arrangement can be achieved by stacking a conductive foam, an insulating plastic film, and an electrically conductive textile.

Another contemplated embodiment has an essentially rigid capacitor pole element with projections and recesses on at least one of its surfaces. Applied thereupon is an insulating device with an essentially uniform thickness. As a result, the insulating device has projections and recesses on its side facing away from the first capacitor pole element, in like manner as the capacitor pole element.

The composite construction of capacitor pole element and insulating device can be produced by coating an electrically conductive textile, for example.

A second capacitor pole element is arranged on the side of the insulating device facing away from the first capacitor pole element. It rests against the projections of the insulating device. In the resting state, the second capacitor pole element is flat, especially on its surface facing toward the insulating device. Consequently it is spaced a distance away from the recesses of the insulating device. The distance in the unloaded state corresponds to a certain normal height.

In the loaded state, a force F causes the second, flexible pole element to be pressed against the insulating device. In the process, the normally flat capacitor pole element takes on a corrugated contour. The shapes of the first pole element and the insulating device remain essentially unaffected by this. In this embodiment, too, the shorter distance between the second capacitor pole element and the insulating device in the region of the recesses results in an increase in the sensor capacitance.

Another contemplated embodiment has a first, flat, electrically conductive capacitor pole element. Arranged thereupon is a second capacitor pole element made of electrically conductive particles. The second capacitor pole element is, embedded in an electrically nonconductive material which simultaneously forms an insulating device with respect to the first capacitor pole element.

In this embodiment, the second capacitor pole element is formed by a mat of metallized fibers. The insulating device is formed by a polyethylene foam which completely penetrates and surrounds the mat.

When the arrangement is subjected to pressure, the foam material that forms the insulating device is elastically deformed. In this process, the particles of the second capacitor pole element embedded in the foam material come closer to the first capacitor pole element. As a result, the capacitance of the sensor increases.

Removing the pressure causes a restoring motion of the flexibly deformed foam material.

From the foregoing, it can be seen that there has been brought to the art a new and improved pressure sensor for vehicle seat applications. While the invention has been described in connection with one or more embodiments, it should be understood that the invention is not limited to these embodiments. Accordingly, the invention covers all alternatives, modifications and equivalents as may be included within the spirit and scope of the appended claims.

What is claimed is:

1. A pressure sensor comprising a first capacitor pole element, a second capacitor pole element, and an electrically nonconductive insulating device, of which at least part is arranged between the two first and second capacitor pole elements, wherein at least one capacitor pole element in at least one section of its surface facing the other capacitor pole element is spaced apart from the insulating device, and wherein the section is adapted to be moved toward the insulating device through flexible deformation of the respective capacitor pole element by subjecting the pressure sensor to pressure.

2. A pressure sensor according to claim 1 wherein at least one of the capacitor pole elements is compressible toward the insulating device.

3. A pressure sensor according to claim 1 wherein at least one capacitor pole element is compressible only in one surface region facing the insulating device.

4. A pressure sensor according to claim 1 wherein at least one capacitor pole element is at least partly rigid.

5. A pressure sensor according to claim 1 wherein at least one of the capacitor pole elements has a metallized textile made of synthetic fibers.

6. A pressure sensor according to claim 1 wherein at least one of the capacitor pole elements has electrically conductive fibers, which are embedded in an electrically nonconductive, elastically deformable material.

7. A pressure sensor according to claim 1 wherein the insulating device is at least partly rigid and is essentially incompressible in the direction of the applied pressure.

8. A pressure sensor according to claim 1 wherein the insulating device is embodied as a foil or film.

9. A pressure sensor comprising a first capacitor pole element, a second capacitor pole element, and an electrically nonconductive insulating device, of which at least part is arranged between the two first and second capacitor pole elements, wherein at least one capacitor pole element has on a surface of its electrically conductive components facing toward the other capacitor pole element, at least one textured region having an associated normal height (H), and wherein the normal height (H) is adapted to be reduced to a detection height (h) through flexible deformation of the respective capacitor pole element when the pressure sensor is subjected to pressure.

10. A pressure sensor according to claim 9 wherein at least one of the capacitor pole elements is compressible toward the insulating device.

11. A pressure sensor according to claim 9 wherein at least one capacitor pole element is compressible only in one surface region facing the insulating device.

12. A pressure sensor according to claim 9 wherein at least one capacitor pole element is at least partly rigid.

13. A pressure sensor according to claim 9 wherein at least one of the capacitor pole elements has a metallized textile made of synthetic fibers.

14. A pressure sensor according to claim 9 wherein at least one of the capacitor pole elements has electrically conductive fibers, which are embedded in an electrically nonconductive, elastically deformable material.

15. A pressure sensor according to claim 9 wherein the insulating device is at least partly rigid and is essentially incompressible in the direction of the applied pressure.

16. A pressure sensor according to claim 9 wherein the insulating device is embodied as a foil or film.

17. A pressure sensor according to claim 9 wherein the normal height (H) of the textured region between the insulating device and the respective capacitor pole element, at least in one section, is between ten microns and ten millimeters.

18. A pressure sensor according to claim 17 wherein one of the capacitor pole elements comprises a base of a vehicle seat.

19. A pressure sensor comprising a capacitor having a first capacitor pole element and a second capacitor pole element, which are arranged at a distance from one another, wherein at least one of said first and second capacitor pole elements has at least one textured region on the surface of its conductive components facing toward the other capacitor pole element, and wherein the distance between the first and second capacitor pole elements is different in the textured region than in a region adjacent to the textured region, and wherein the difference between the distance between the first and second capacitor pole elements in the textured region and the region adjacent to the textured region is adapted to change by deformation of at least one of said first and second capacitor pole elements when the capacitor is subjected to pressure, and wherein at least one of the capacitor pole elements has a metallized textile made of synthetic fibers.

20. A pressure sensor comprising a capacitor having a first capacitor pole element and a second capacitor pole element, which are arranged at a distance from one another, wherein at least one of said first and second capacitor pole elements has at least one textured region on the surface of its conductive components facing toward the other capacitor pole element, and wherein the distance between the first and second capacitor pole elements is different in the textured region than in a region adjacent to the textured region, and wherein the difference between the distance between the first and second capacitor pole elements in the textured region and the region adjacent to the textured region is adapted to change by deformation of at least one of said first and second capacitor pole elements when the capacitor is subjected to pressure, and wherein at least one of the capacitor pole elements has electrically conductive fibers, which are embedded in an electrically nonconductive, elastically deformable material.

21. A pressure sensor comprising a capacitor having a first capacitor pole element and a second capacitor pole element, which are arranged at a distance from one another, wherein at least one of said first and second capacitor pole elements has at least one textured region on the surface of its conductive components facing toward the other capacitor pole element, and wherein the distance between the first and second capacitor pole elements is different in the textured region than in a region adjacent to the textured region, and wherein the difference between the distance between the first and second capacitor pole elements in the textured region and the region adjacent to the textured region is adapted to change by deformation of at least one of said first and second capacitor pole elements when the capacitor is subjected to pressure, and wherein at least two different, electrically nonconductive media are arranged between the two capacitor pole elements, and wherein at least one of the media is a fluid which can be displaced from the region between the two capacitor pole elements when pressure is applied to the pressure sensor.

* * * * *